United States Patent [19]

Jeremiah et al.

[11] Patent Number: 5,446,850
[45] Date of Patent: Aug. 29, 1995

[54] CROSS-CACHE-LINE COMPOUNDING ALGORITHM FOR SCISM PROCESSORS

[75] Inventors: Thomas L. Jeremiah, Endwell; Bartholomew Blaner, Newark Valley, both of N.Y.

[73] Assignee: International Business Machines Corporation, Armonk, N.Y.

[21] Appl. No.: 281,321

[22] Filed: Jul. 27, 1994

Related U.S. Application Data

[63] Continuation of Ser. No. 875,507, Apr. 29, 1992, abandoned, which is a continuation-in-part of Ser. No. 642,011, Jan. 15, 1991, Pat. No. 5,295,249, and a continuation-in-part of Ser. No. 677,685, Mar. 29, 1991, Pat. No. 5,303,356.

[51] Int. Cl.6 .................................................. G06F 12/08
[52] U.S. Cl. ................................. 395/375; 395/250; 364/964.2; 364/243.4
[58] Field of Search .................... 395/375, 800, 250

[56] References Cited

U.S. PATENT DOCUMENTS

5,197,135  3/1993  Eickemeyer .......................... 395/375
5,214,763  5/1993  Blaner ................................. 395/375

*Primary Examiner*—David Y. Eng
*Attorney, Agent, or Firm*—Lynn L. Augspurger; Laurence J. Marhoefer

[57] ABSTRACT

A system for compounding instructions across cache line boundaries transfers an instruction line from a relatively slow memory to a instruction compounding unit if there is a miss for an instruction in that line in the instruction cache. At the same time the numerically preceding instruction in cache is transferred to the instruction compounding unit and instructions from the two lines are compounded. If a numerically preceding cache line has been compounded with a cache line that has been deleted and then replaced, compounding tags for the numerically preceding cache line are deleted.

5 Claims, 9 Drawing Sheets

CROSS-CACHE-LINE COMPOUNDING ALGORITHM FOR SCISM PROCESSORS

RELATED APPLICATIONS UNDER 35 U.S.C. 120

This is a Continuation of application No. 07/875,507, filed Apr. 29, 1992 now abandoned. This application is entitled to claim and claims priority from the following applications of which it is a continuation-in-part: application Ser. No. 07/642,011, filed Jan. 15, 1991, entitled "Compounding Preprocessor for Cache", the inventors being Bartholomew Blaner et al. now U.S. Pat. No. 5,295,249; and application Ser. No. 07/677,685, filed Mar. 29, 1991, entitled "System for Preparing Instructions for Instruction Processor and System with Mechanism for Branching in the Middle of a Compound Instruction", the inventors being S. Vassiliadis et al. now U.S. Pat. No. 5,303,356.

FIELD OF THE INVENTION

These invention relate to high-speed computers and computer systems and particularly to computer systems which preprocess instructions for the purpose of appending control information which is placed in a cache along with the instructions and subsequently used to control execution of the computer system.

CROSS REFERENCE TO APPLICATIONS

The present application related to the following patent applications:

(1) application Ser. No. 07/519,384, filed May 4, 1990, entitled "Scalable Compound Instruction Set Machine Architecture", the inventors being Stamatis Vassiliadis et al now abandoned;

(2) application Ser. No. 07/519,382, filed May 4, 1990, entitled "General Purpose Compound Apparatus For Instruction-Level Parallel Processors", the inventors being Richard J. Eickemeyer et al now abandoned;

(3) application Ser. No. 07/522,219, filed May 10, 1990, entitled "Compounding Preprocessor For Cache", the inventors being Bartholomew Blaner et al now U.S. Pat. No. 5,035,378; and (4) application Ser. No. 07/543,464, filed Jun. 26, 1990, entitled "An In-Memory Preprocessor for a Scalable Compound Instruction Set Machine Processor, the inventors being Richard Eickemeyer et al. now abandoned (5) application Ser. No. 07/543,458, filed Jun. 26, 1990, entitled "Memory Management for Scalable Compound Instruction Set Machines with (In countries which publish after eighteen months from the priority date corresponding applications related to the above five U.S. applications have been filed.) now U.S. Pat. No. 5,197,135

(6) application Ser. No. 07/619,868, filed Nov. 28, 1990, entitled "Overflow Determination for Three-Operand ALUS in a Scalable Compound Instruction Set Machine", the inventors being Stamatis Vassiliadis et al now U.S. Pat. No. 5,301,341; and (7) application Ser. No. 07/642,011, filed Jan. 15, 1991, entitled "Compounding Preprocessor for Cache", the inventors being Bartholomew Blaner et al., an application from which priority is claimed now U.S. Pat. No. 5,295,249; and (8) application Ser. No. 07/677,066, filed Mar. 29, 1991, entitled "System for Compounding Instructions for an Instruction Processor with Different Attributes with Apparatus for Handling Test and Data with Differing Reference Point Information and Backward Compounding Apparatus for Compound Instructions", the inventors being Eickemeyer et al now abandoned; and (9) application Ser. No. 07/677,685, filed Mar. 29, 1991, entitled "System for Preparing Instructions for Instruction Processor and System with Mechanism for Branching in the Middle of a Compound Instruction", the inventors being S. Vassiliadis et al. now U.S. Pat. No. 5,305,356, an application from which priority is claimed.

These applications and the present application are owned by one and the same assignee, namely, International Business Machines Corporation of Armonk, N.Y.

The descriptions set forth in these applications are hereby incorporated into the present application by this reference. These descriptions have been published in related applications filed in other countries as of approximately 18 months after the U.S. filing date.

BACKGROUND OF THE INVENTION

U.S. Pat. No. 5,051,940, issued Sep. 25, 1991, to S. Vassiliadis et al., entitled: "Data Dependency Collapsing Hardware Apparatus," is one of several prior developments in the art related to a SCISM processor, a high speed computer which is enabled by compounding and compounding apparatus, to provide parallel performance of systems which can process instructions and data for programs which could be handled by older architectures, but which can also be handled by newer architectures which employ the Scalable Compound Set Machine Architecture which was introduced in the description of U.S. Pat. No. 5,051,940 and in the above referenced applications.

In high speed computers, it is desirable; to reduce the time required to complete, or execute, each instruction in order to improve performance. This is typically done by clocking the processor at the maximum rate that can be sustained by the underlying circuitry, or by reducing the average number of clock cycles needed to complete instruction execution through some form of parallel operation. One such form of parallelism well known in the art is pipelining, wherein instruction execution is subdivided into a-number of specifically defined steps related to various areas of logic, or pipeline stages, in the processor. As one instruction completes its activity in a given pipeline stage, it is sent to the next stage, and a subsequent instruction can then make use of the stage vacated by the instruction ahead of it. Thus, several instructions are typically being executed simultaneously in such a computer system, but each instruction is dispatched for the execution process one at a time. More recently, in order to further improve performance, computer designs have been developed wherein multiple instructions may be simultaneously dispatched for execution, provided such instructions do not conflict with each other while being executed. Sufficient hardware must be provided so that the instructions which simultaneously occupy a given stage in the pipeline can execute without interfering with each other. Typically, the instructions are processed through the pipeline together and are completed simultaneously, or at least in conceptual order. This mode of execution has been given the name superscalar execution.

One of the difficulties which typically must be addressed in superscalar processor design is making the decision whether multiple instructions may in fact be simultaneously executed. In most cases, the superscalar designs will not be able to simultaneously execute any and all possible combinations of instructions due to interdependencies between some instructions, and perhaps some limitations of the underlying hardware. Therefore, as instructions reach the point where execution is to begin, a decision must be made whether to permit parallel execution, or default to single instruction execution mode. The decision is usually made at the time instructions enter the pipeline, by logic circuits which decode the instructions to detect whether conflicts actually exist. Depending on the particular instruction set architecture, the decoding process may be relatively complicated and require a large number of logic stages. This can reduce performance either by increasing the cycle time of the processor, or by requiring an additional pipeline stage to perform the aforementioned decoding process, either of which will reduce performance.

SCISM application Ser. No. 07/519,382 provides a solution for the problem of delay caused by the need to analyze instructions for superscalar execution through the expedient of preprocessing the instruction stream and making a determination of groups of instructions suitable for superscalar execution. These groups of instructions are called compound instructions, and are composed of the original instructions and an associated tag which indicates whether parallel execution is permitted. SCISM application Ser. No. 07/522,291 proposes an Instruction Compounding Unit, or ICU as a means of performing the instruction compounding analysis required by Scalable Compound Instruction Set Machines (SCISM). Instructions are analyzed by the ICU as they are fetched from memory and placed in a cache. The ICU forms the tag, which is logically stored along with the instructions in the cache. Certain problems arise, however, when the ICU concept is applied to S/370 and related architectures. In particular, portions of cache lines that have not or cannot be analyzed for compounding may result.

U.S. Pat. No. 5,051,940 has provided a solution for this problem to a large extent using what is termed the worst-case compounding algorithm. With this algorithm, the contents of a cache line, be it instructions, data, or instructions mixed with data, may be analyzed for compounding in its entirety without regard to any instruction boundaries within the cache line. Still, the problem of compounding across cache line boundaries, or cross-line compounding, remains. An instruction can only be compounded with a subsequent instruction if the subsequent instruction is available for analysis at the time the compounding process occurs. Instructions situated near the end of a cache line may not be considered for compounding unless the next sequentially addressable cache line is also present, and therefore typically are ineligible for parallel execution, thereby decreasing processor performance.

The degree to which performance is compromised depends on a number of circumstances, such as cache line size and the frequency of execution of particular sequences of instructions. Larger cache line sizes reduce the percentage of instructions which reside adjacent to cache line boundaries, but there is usually an optimum upper bound on cache line size that if exceeded, will decrease performance due to excessive storage accesses for unneeded data. Frequency of instruction execution is typically not correlated with cache line boundaries, and it is perfectly possible for a performance-critical loop in the instruction stream to sit astride a cache line boundary. This effect can contribute to unpredictable and unsatisfactory performance.

In application Ser. No. 07/522,291, the inventors suggest cache line pre-fetching as a means of facilitating cross-line compounding. However, cache line prefetching creates other problems, two of which are set out here.

1. Room must be made in the cache for the prefetched line, possibly causing a soon-to-be-needed line to be removed from the cache in favor of the prefetched line, which may in fact, never be used, resulting in decreased processor performance.

2. Depending on the processor busing structure, prefetching may require occupation of the processor data bus while the line is being prefetched. Consequently, the processor's execution units may be blocked from using the bus while the fetch is in progress. Any such blockage results in decreased performance.

It is desirable to provide a means for allowing compounding of instructions across cache line boundaries without the requirement to prefetch cache lines.

SUMMARY OF THE INVENTION

The improvements which we have made achieve an enhancement in cross-cache-line compounding that makes use of existing cache lines, i.e., does not require that new cache lines be prefetched, and therefore displaces no lines from the cache; and can be accomplished while a missed cache line is being fetched from the next level in the storage hierarchy, thus requiring no additional processor time beyond that required to process the cache miss and analyze the line for compounding. Thus, the operation of the algorithm can be substantially overlapped with normal cache miss and ICU operation, causes no undesirable side effects in the cache, and, therefore, exhibits an improvement over prior techniques.

These improvements are accomplished by providing means for accessing a cache and its associated directory for a second cache line, following a cache miss for a first cache line, during the period the cache is waiting for the first cache line to be returned from the next level in the memory hierarchy. The address used to access the cache and directory during this interval is that of the immediately preceding cache line. An address decrementer is provided, along with multiplexer means to allow the decremented address to be used to access the cache and directory. Further, means are provided to save the result of the cache and directory access for the second cache line until such time as they are required in the instruction compounding process. The directory access will indicate whether the second cache line resides in the cache, and this indication will control whether or not cross-cache-line compounding is enabled. The portion of the second cache line closest to the end of the line is saved in a buffer and used by the ICU to create compound instructions which may cross the boundary between said second cache line and said first cache line.

Certain computer architectures which permit instruction stream modification, either by the processor itself or other processors in a multiprocessor configuration require a further step in the cross-line compounding process to avoid erroneous results. In such an environment, it is possible for a cache line that has previously been compounded with the numerically preceding cache line to be deleted from the cache and then later refetched in modified form, in which case, the compounding information contained in the numerically preceding cache line could be incorrect. Deletion of a cache line is most often caused by the need to make room for new cache lines, but it can also be caused by various cache coherency protocols commonly employed in multi-processors. A buffer provides a means for saving the address tag of the line being deleted from the cache during the access for said first cache line, for decrementing it appropriately, and then for comparing it to all address tags read out from the directory during the access for said second cache line. A determination is made whether the line; being deleted sequentially follows any of the lines identified during the second directory access. If the sequentially previous line is present, its compounding bits that were derived based on instructions in the line being replaced are reset. If the sequentially previous line is not present, no action is necessary. Furthermore, if some form of instruction buffer exists between the cache and the point at which compound instructions are dispatched into the pipeline, it is possible that the buffer may contain some portion of the cache line whose compounding bits must be reset. In this case, it will be necessary to delete the erroneous compounding information from said instruction buffer, or, alternatively as a simplification, to delete all compounding information from the buffer whenever any line is replaced in the cache.

These and other improvements are set forth in the following detailed description. For a better understanding of the invention with advantages and features, reference may be had to the description and to the drawings.

BRIEF DESCRIPTION OF THE DRAWINGS

Our detailed description explains the preferred embodiments of our invention, together with advantages and features, by way of example with reference to the following drawings.

DETAILED DESCRIPTION OF THE INVENTIONS

Figure 1:
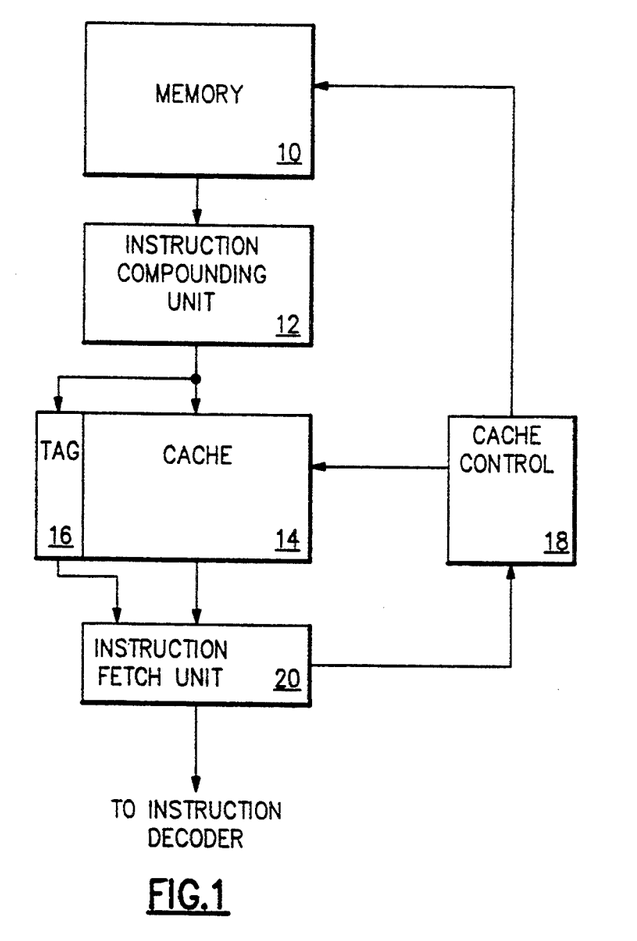
FIG. 1 shows schematically an overview of the preferred embodiment and particularly shows a cache operatively coupled to a memory system through an Instruction Compounding Unit. The output of the cache is connected to the instruction fetching means of the processor and provides compound instructions to the processor.

Before considering our preferred embodiments in detail, it may be worthwhile to illustrated by way of example, the operation of a representative Instruction Compounding Unit (ICU) with reference to FIG. 1 which shows schematically the digital processing systems instruction compounding mechanism.

In FIG. 1, the ICU 12 is situated between MEMORY 10 and CACHE 14, where it processes instructions to form tag entries for TAG array 16.

Figure 2:
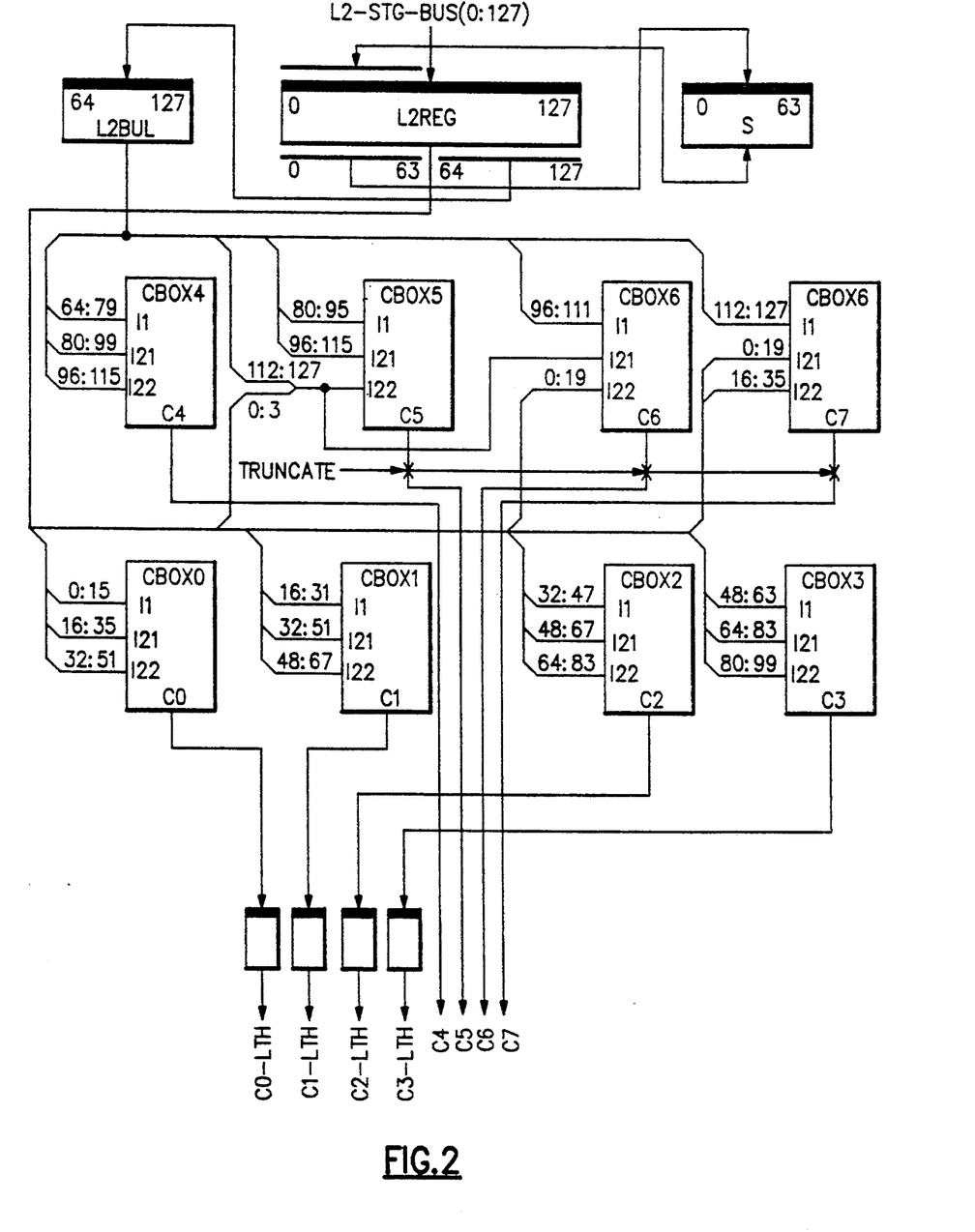
FIG. 2 shows a representative Instruction Compounding Unit.

An ICU is illustrated in FIG. 2. L2_STG_BUS is the 16-byte (quadword, QW) data bus connecting level-2 cache storage (L2) to the ICU and instruction cache. A QW from L2_STG_BUS is latched in L2REG. The low-order doubleword (DW) of L2REG is pipelined to L2BUL. An instruction cache line is assumed to be 128 bytes; thus, 8 L2_STG_BUS transfers are required to transfer the entire line. QWs in the line are numbered from 0 to 7, from the low-order address to the high. The line is assumed to be rotated so that the QW containing the instruction needed by the instruction execution unit is received first. For example, if the instruction required by the instruction execution unit is in QW6 of a given line, the line is received in the order QW6, QW7, QW0, OW1, QW2, QW3, QW4, and QW5.

The Compounding boxes (CBOX) perform the actual compounding analysis. The boxes are designed and organized to perform a worst-case compounding algorithm as described in application Ser. No. 07/519,384 (IBM Docket EN9-90-019) wherein each halfword (HW) in the line is assumed to start an instruction. Each CBOX produces a compounding bit (C bit) for the presumed instruction present on its I1 input. Eight HWs are processed per cycle, yielding C bits C0–C7. C0–C3 are latched at the end of the cycle in C0_LTH through C3_LTH. The complete set of C bits for OWn are given by C0_LTH || C1_LTH || C2_LTH || C3_LTH || C4 || C5 || C6 || C7 and are valid when QWnL$^1$ is in L2BUL and OWn+1 (n modulo 8) is in L2REG. The sequential nature of the C bit production will become more apparent from the timing diagrams discussed below.

The suffix "H" refers to bits 0–63 (bytes 0–3); "L" refers to bits 64–127 (bytes 4–7). The symbol || represents bit concatenation.

The ICU is designed to correctly perform compounding for an arbitrarily rotated line, where "correct" means 1. up to the last three C bits for a line may be forced to zero (truncated), i.e., the C bits for the last 3 HWs of QW7, since compounding across cache lines is accomplished by other means described herein, and
2. if the line has been rotated, i.e., a QW other than QW0 is received first, then compounding analysis is performed for instructions lying on the boundary between the last and first QWs received.

In the above example, QW6H is saved in the S register so that when QW5 is received, instructions in QW5L may be compounded with those in QW6H.

A controlling finite state machine (ICU FSM) is required to properly sequence the compounding of an eight-QW cache line. The following signals are input from an instruction cache miss handling finite state machine:

DVALID If asserted, the QW on L2_STG_BUS is a valid datum.

FIRSTQW Asserted when the first QW of the bus transfer is on the L2_STG_BUS.

LASTQW Asserted when the last QW of the bus transfer is on the L2_STG_BUS.

EOL (End of Line) Asserted when QW7 is on the L2_STG_BUS.

In response to these inputs, the ICU FSM produces the following output signals:

LD_L2 If asserted, load L2REG

LD_S If asserted, load S; otherwise, hold S

LD_L2BUL If asserted, load L2BUL and Cx_LTH; otherwise, hold L2BUL and Cx_LTH.

GT_S_L2H Gate S to L2REGH

TRUNCATE If asserted, zero the C bits for HWs 5, 6, and 7 of QW7.

CVALID If asserted, the contents of C0-3_LTH || C4-C7 are valid C bits for the QW whose low DW is in L2BUL.

Figure 3:
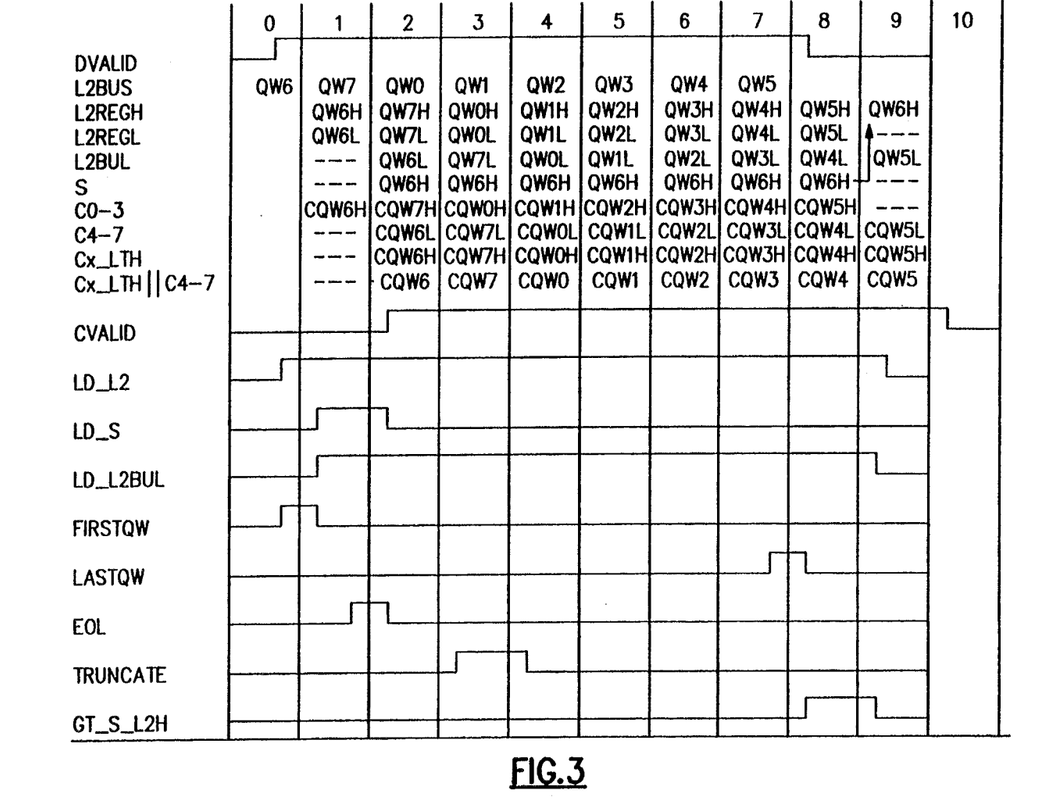
FIG. 3 shows a representative cache line inpage operation with instruction compounding, starting with the next-to-last quadword in the cache line.
Figure 4:
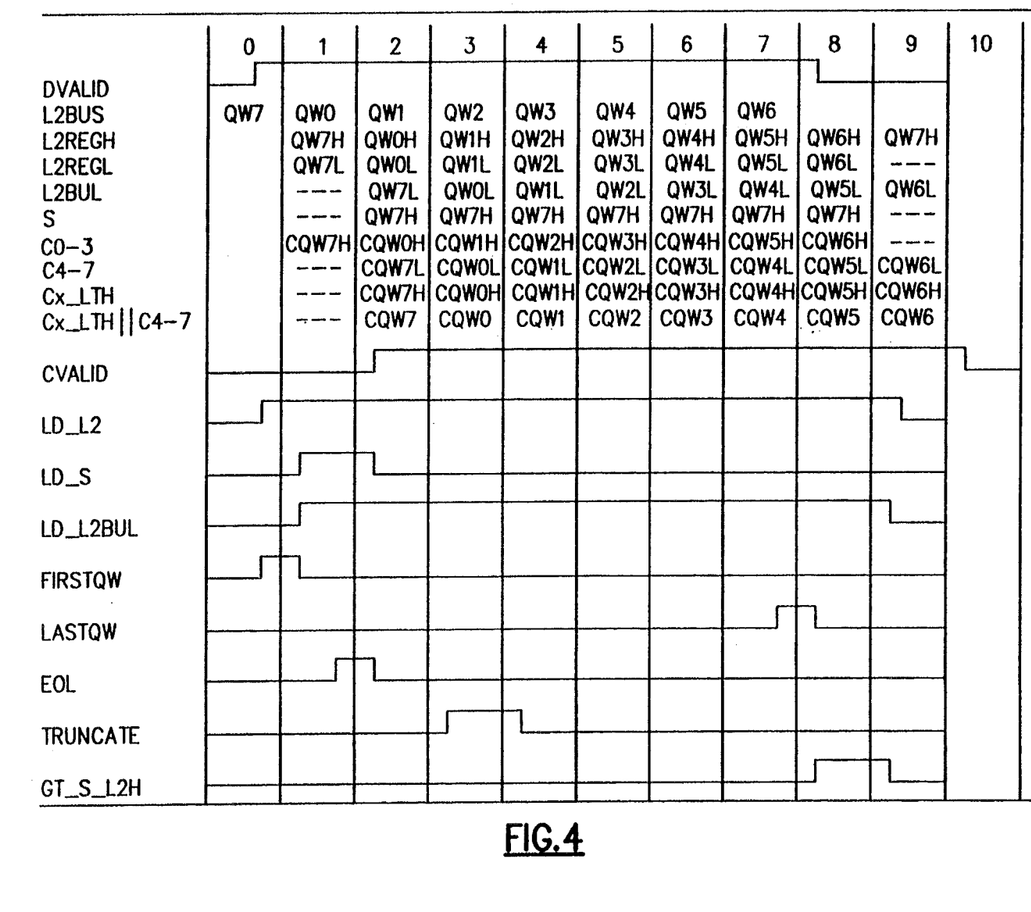
FIG. 4 shows a representative cache line inpage operation with instruction compounding, starting with the last quadword in the cache line.
Figure 5:
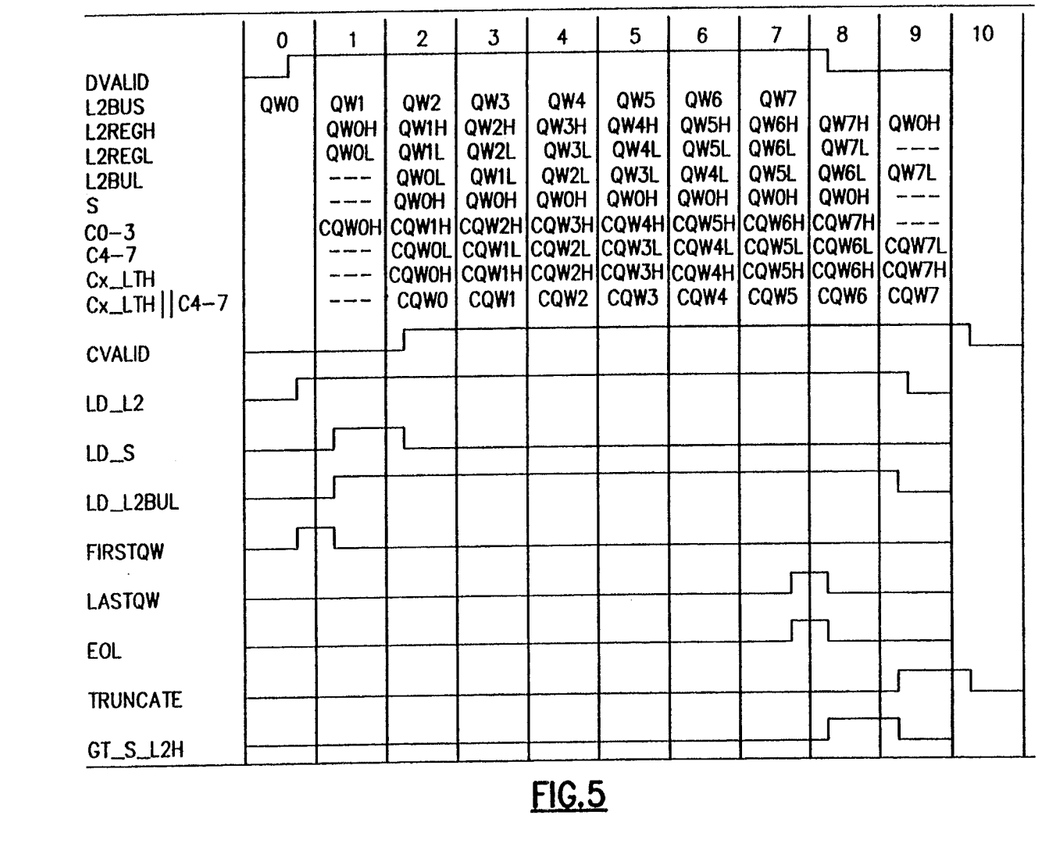
FIG. 5 shows a representative cache line inpage operation with instruction compounding, starting with the first quadword in the cache line.

FIGS. 3, 4, and 5 illustrate the operation of the ICU for three representative rotations of the incoming line with contiguous transfer of all eight QWs. The QW notation is as before, with one addition: CQWn refers to the C bits for OWn.

Referring to FIG. 3, the ICU operation is as follows. Assume that an instruction cache miss has occurred and that QW6 is the required QW. In cycle 0, QW6 is on L2_STG_BUS, and DVALID is asserted. This causes FIRSTQW to be asserted, which, in turn, causes LD_L2 to be asserted and also triggers the one-cycle assertion of LD_S in cycle 1. LD_L2 remains asserted until the cycle after GT_S_L2H has been asserted (cycle 8). In cycle 1, QW7 is on L2_STG_BUS. Since this is the last (right-most) QW of the line, EOL is asserted. The assertion of EOL triggers the assertion of TRUNCATE in cycle 3. Since LD_S is asserted, QW6H will be latched in S at the end of cycle 1, where it will be held until cycle 9. LD_L2BUL is also asserted. Thus, the low DW of L2REG will be latched in L2BUL at the end of the cycle. Also, C bits for QW6H (CQW6H) are produced by CBOXes 0-3 and are latched in their respective latches.

In cycle 2, QW7 is latched in L2REG. Now valid C bits can be produced for QW6L, which is now in L2BUL. These C bits are present on the outputs of CBOXes 4-7. Thus, C0-3_LTH || C4-7 constitute the C bits for QW6, the low DW of which is now in L2BUL.

In cycle 3, valid C bits are available for QW7, now in L2BUL, but C5, C6, and C7 must be truncated. Thus, TRUNCATE is asserted in this cycle, which forces these bits to zero.

Production of C bits continues routinely until cycle 7 when LASTQW is asserted. In cycle 8, GT_S_L2H is asserted, causing QW6H (the high DW of the first QW received) to be gated into L2REGH at the end of the cycle. Simultaneously, QWSL is gated into L2BUL, as usual. Then, in cycle 9, valid C bits are produced for QW5. The operation is complete.

FIG. 4 illustrates the timing of ICU operations when QW7 is received first. The diagram is instructive in that it demonstrates ICU behavior in the event that FIRSTQW and EOL are asserted simultaneously. FIG. 5 illustrates ICU timing when the line is not rotated, i.e., QW0 is received first.

THE PREFERRED EMBODIMENT

Figure 6:
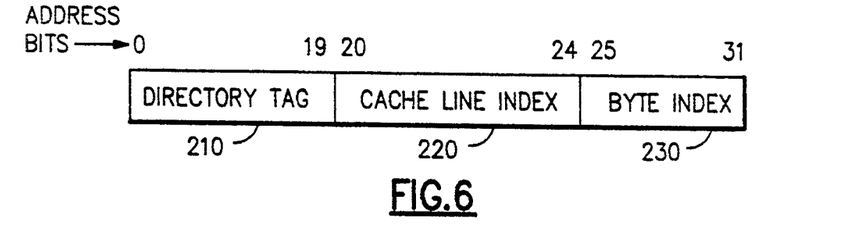
FIG. 6 shows a memory address apportioned into directory tag, cache line index, and byte index fields, using big-endian notation.
Figure 7:
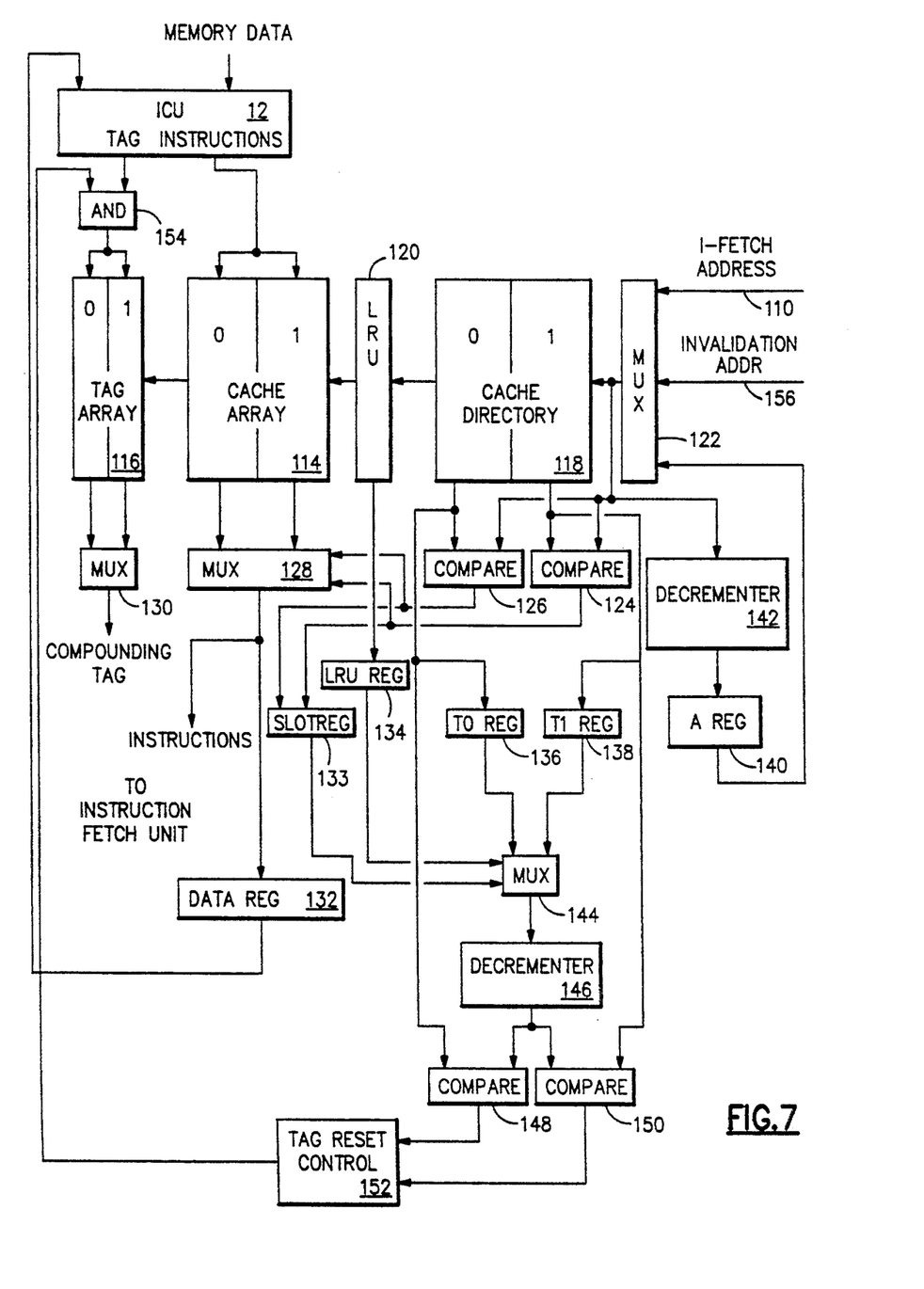
FIG. 7 shows a cache with associated address and data registers, and cache directory. The address decrementer means and multiplexer means in the preferred embodiment are also shown.

Turning now to our invention in greater detail, it will be seen from FIG. 1 that instructions are fetched from memory 10 and brought into the cache 14 through Instruction Compounding unit 12 and subsequently made available to the processor for execution via Instruction Fetch Unit 20. Instructions are brought into the cache in blocks, or lines, and placed into the cache 14 according to mechanisms that are well known in the art, and consequently not reiterated here. Lines are mapped into the cache based on a certain portion of the memory address, the cache line index 220 in FIG. 6. Lines whose addresses differ in the cache line index portion of the address are said to reside in different congruence classes. Multiple lines may exist in the cache-in the same congruence class if the cache is so designed, and lines in the same congruence class are said to reside in different associativity classes. The particular design shown in FIG. 7 is that of a two-way associative cache. However, the invention is equally applicable to caches with greater associativity. As the instructions are brought in from memory 10, they pass through the Instruction Compounding Unit 12, or ICU, where individual instructions are analyzed and where possible, are aggregated into compound instructions according to one of the methods described in the references. The ICU produces a series of tag bits which are stored in tag array 16 which is accessed in parallel with the cache array, and correspond to instructions accessed from the cache array itself. Thus the cache and tag arrays, when accessed together, provide compound instructions for subsequent execution. Cache control logic 18 receives address and control information from instruction fetch unit 20 and provides address and control signals to cache 14, tag array 16, and memory 10.

Referring now to FIG. 7, the cache directory 118 is accessed using the cache line index 220 portion of the I-FETCH ADDRESS 110 to determine whether a particular cache line is present in the cache. LRU array 120, cache array 114, and compounding tag array 116 are also accessed at the same time using cache line index 220. The presence of a cache line is indicated by a match of a directory tag 210 portion of the address with one of the directory tags accessed from directory 118. The comparison is done by compare logic 124 and 126. If the line is present in cache array 114, the contents of the cache line, or a subportion thereof, are selected by mux 128 under control of the compare circuits 124 and 126. Selection of the correct compounding tag bits is accomplished by mux 130 using the same controls. Fetched instructions are passed to the processor and processing continues. If the particular line is absent, the directory compare circuitry will so indicate, causing a fetch to memory. Usually, this fetch will take several cycles, during which time the processor is stalled, and the cache merely waits for the requested data. In the present invention, the address of the line that will be replaced (if any) is saved in T0REG 136 or T1REG 138 for further use. Selection of the line to be replaced is made in this example by a Least-Recently-Used, or LRU indicator bit that is fetched from LRU array 120 and saved in LRU REG 134, in combination with a bit for each cache line (not shown) which is typically used to indicate whether a valid cache line has been previously fetched. The output of the LRU REG 134 and cache validity bits control selection of either T0REG 136 or T1REG 138 in MUX 144. The output of MUX 144 is the address tag of the line being replaced, assuming a valid line is in fact being replaced. The address tag is decremented by one in the low order position by decrementer 146.

Meanwhile, the address used to access the cache is decremented by one in the low order position of the CACHE LINE INDEX portion of the address 220 using decrementer 142. The BYTE INDEX portion of the address 230 is forced to all 1's to cause the subsequent access to fetch the last doubleword in the cache line. The decremented address is saved in A REG 140. Assuming a cache miss occurs, the cache is subsequently accessed using the decremented address in A REG 140 which is gated through MUX 122. The purpose of the second access is to ascertain whether the line preceding the one being simultaneously fetched from memory is present and if it is, to fetch and retain the last doubleword in the line. Determination of the presence of the previous line is made on the second cache access via COMPARE 124 and COMPARE 126 which operate in the same manner as they did on the original cache access, but this time with the decremented address from A REG 140 through MUX 122. Assuming a successful compare occurs, the last doubleword of the cache line accessed from CACHE ARRAY 114 and is selected in MUX 128 by the output of the COMPARE 124 or COMPARE 126. The selected doubleword is saved in DATA REG 132. The output of DATA REG 132 is sent back to ICU 12 for use at the appropriate step in the compounding process.

Also during the second access, the address tags read from CACHE DIRECTORY 118 are compared with the output of DECREMENTER 146 by COMPARE 148 and COMPARE 150. A successful compare at this point indicates the line being replaced in the cache by the new line may have been compounded across the line boundary, and that its sequentially previous line is still in the cache, necessitating the resetting of the compounding bits associated with the last doubleword of said previous line. TAG RESET CONTROL 152 uses the outputs of COMPARE 148 and COMPARE 150 to generate the necessary control signals to TAG ARRAY 116 to reset the appropriate compounding tags. One such control signal is an input of AND function 154, which consists of four AND gates in the preferred embodiment. Said input causes the tag data at the input of TAG ARRAY 116 to be in the reset state. Another control generated by TAG RESET CONTROL 152 enables the write control input of TAG ARRAY 116. The write control input is activated only if a compare occurs in COMPARE 148 or COMPARE 150, and the corresponding associativity class in TAG ARRAY 116 is enabled for resetting the compounding bits.

We have just described the process of accessing a cache for instructions which causes a cache miss, subsequently resulting in a second cache access to determine whether the cache line immediately preceding the one to be fetched from memory is present, and the process by which the last doubleword of the preceding line is saved for compounding with the beginning of the new line being fetched. We have also described the process by which compounding bits are reset if necessary for the cache line being replaced with the new line. We will now describe the process for resetting compounding bits for a cache line which immediately precedes a line which is invalidated.

In certain processor architectures, cache lines may be subject to removal from the cache for reasons other than making room for a new line. The removal process is frequently referred to as invalidation. An invalidation request is received by the cache control logic, along with the identity of the cache line to be removed. In FIG. 7, the identity of the line is provided on INVALIDATION ADDR bus 156. The address provided may consist of a complete address, or may only identify the congruence class and associativity slot in the directory. In the latter case, the normal procedure is to merely reset the validity bit identified by the congruence class and associativity slot directly. If a complete address is specified, the directory must first be accessed to determine whether the cache line is in fact present, and if present, in which associativity slot it resides. The validity bit associated with the line to be invalidated is then reset on a subsequent access.

In the preferred embodiment, a complete address is specified on INVALIDATION ADDR BUS 156, and CACHE DIRECTORY 118 is accessed in normal fashion. Directory tags are compared to the DIRECTORY TAG portion 210 of the address. DECREMENTER 142 decrements the address by one in the low order portion of the CACHE LINE INDEX 220 portion of the address, saving the result in A REG 140. It is not necessary to alter the BYTE INDEX 230 portion of the address. COMPARE 124 and COMPARE 126 identify whether the line to be invalidated is present. Successful compare signals are saved in SLOT REG 133 for use subsequently in selecting T0REG or T1REG via MUX 144.

Assuming the line is present, the directory is again accessed using INVALIDATION ADDR 156, this time resetting the validity bit for the appropriate line in the directory. On the following cycle, A REG 140 is gated through MUX 122 to access the directory. The address tags in CACHE DIRECTORY 118 are sent to COMPARE 148 and COMPARE 150 for comparison with the output of DECREMENTER 146. A match in either COMPARE circuit indicates the line immediately preceding the one just invalidated is also present in CACHE 118. TAG RESET CONTROL 152 generates the necessary control lines to TAG ARRAY 116 exactly as previously described for the case where the line was replaced by a new cache line.

If an instruction buffer exists in the particular computer employing the present invention, and if the instruction set architecture allows instruction stream modification, means must be provided to ensure that compounding bits previously fetched into the instruction buffer remain valid at all times. It is possible that the latter portion of a first cache line could have been fetched from the cache, along with its compounding bits, into the instruction buffer just prior to the time when a second, sequential line is removed from the cache. Since the second line may be subject to modification before being refetched, and the first line is already in the instruction buffer, its compounding bits which depend on the state of the second line may be incorrect.

In the preferred embodiment, the default value for the compounding tag bits is zero, indicating parallel instruction dispatch is not enabled. It is merely necessary to reset the aforementioned compounding bits in the instruction buffer whenever a line is deleted from the cache, either by replacement or invalidation. It is not necessary to remove the instructions themselves from the instruction buffer, since they are still valid and can be executed sequentially with minor performance degradation. Various strategies may be employed to determine which compounding bits in the instruction buffer to rest. It is desirable to avoid unnecessarily resetting compounding bits for performance reasons. At one extreme, the finite state machine which controls the cache may simply cause all compounding bits in the instruction buffer to be reset whenever a line is deleted from cache. This is the simplest approach, but results in the most performance degradation due to resetting compounding bits unnecessarily. At the other extreme, it is possible to identify within the instruction buffer exactly which address each instruction was fetched from, and only reset the compounding bits that depend on the line being deleted. Between the two extremes, various strategies may be employed to help identify entries in the instruction buffer whose compounding tag bits are subject to being reset.

Figure 8:
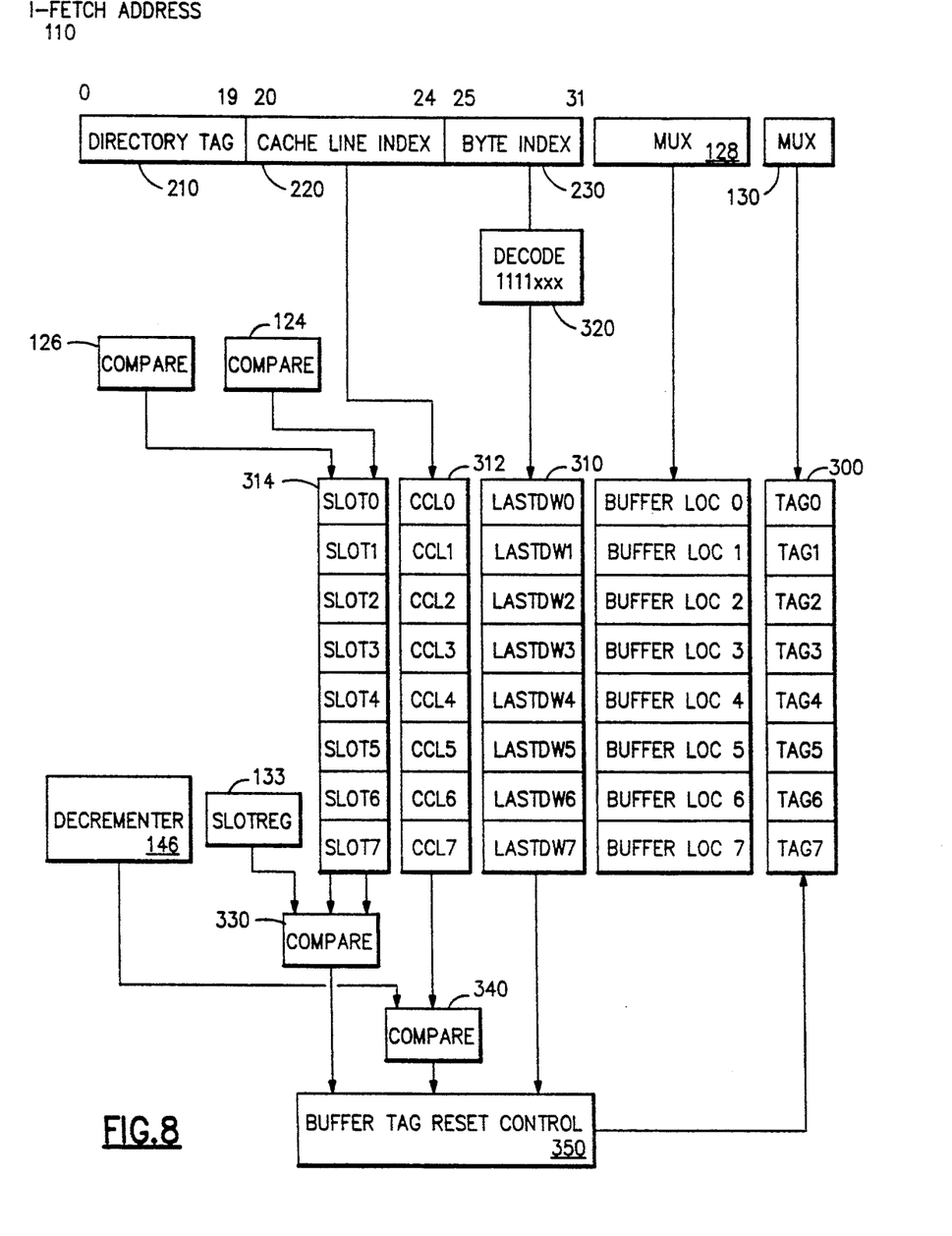
FIG. 8 shows a representative instruction buffer with associated latches which specify from where in a cache each buffer entry was fetched

FIG. 8 shows a representative instruction buffer having eight buffer locations with compounding tags 300 and three status fields LASTDW 310, CCL 312, and SLOT 314. In the preferred embodiment, each instruction location in the instruction buffer is provided with a latch, called LASTDW, which indicates whether it was fetched from the portion of any cache line, i.e., the last doubleword of the line, whose tag bits can be reset due to line deletion. The BYTE INDEX 230 portion of I-FETCH ADDRESS 110 is decoded for a binary value of '1111xxx' by decoder 320 to identify the last doubleword in the line. The decoder output is used to set the latches in the instruction buffer whenever an instruction fetch occurs and one or more buffer locations are being set. Upon performing a line deletion, the cache control finite state machine will signal the BUFFER TAG RESET CONTROL 350 to reset all compounding TAGs 300 whose LASTDW latch is ON. In this way, only the tags for instructions fetched from the last doubleword of the cache line are reset, significantly reducing the instances of unnecessarily resetting compounding tags.

If further performance improvement is desired, each location in the instruction buffer can be further identified by associativity slot or congruence class (or both) upon fetching, and that information stored in the instruction buffer along with the compounding tag. In FIG. 8, the congruence class is obtained from the CACHE LINE INDEX 220 portion of the I-FETCH address 110 and stored in the CCL 312 entry in the instruction buffer. The associativity slot is obtained from directory output COMPAREs 124 and 126 and stored in the SLOT 314 entry in the instruction buffer. Upon line deletion, SLOT0 through SLOT7 are compared with the associativity slot from SLOTREG 133 using COMPARE 330. CCL0 through CCL7 are compared with the decremented congruence class provided by DECREMENTER 146 in COMPARE 340. If a match occurs, the corresponding compounding tag bits are reset in the instruction buffer by BUFFER TAG RESET CONTROL 350. It is not necessary to save all congruence class address bits in the CCL entry in the instruction buffer. In order to reduce the number of bits that are saved, any number of congruence class bits can be saved, and matched with the corresponding bits from DECREMENTER 146. As the number of bits are reduced, the incidence of unnecessary tag bit reset operations increases, however.

We now describe the process of creating the compounding bits associated with the last doubleword of a first cache line which immediately precedes a second line being inpaged.

Figure 9:
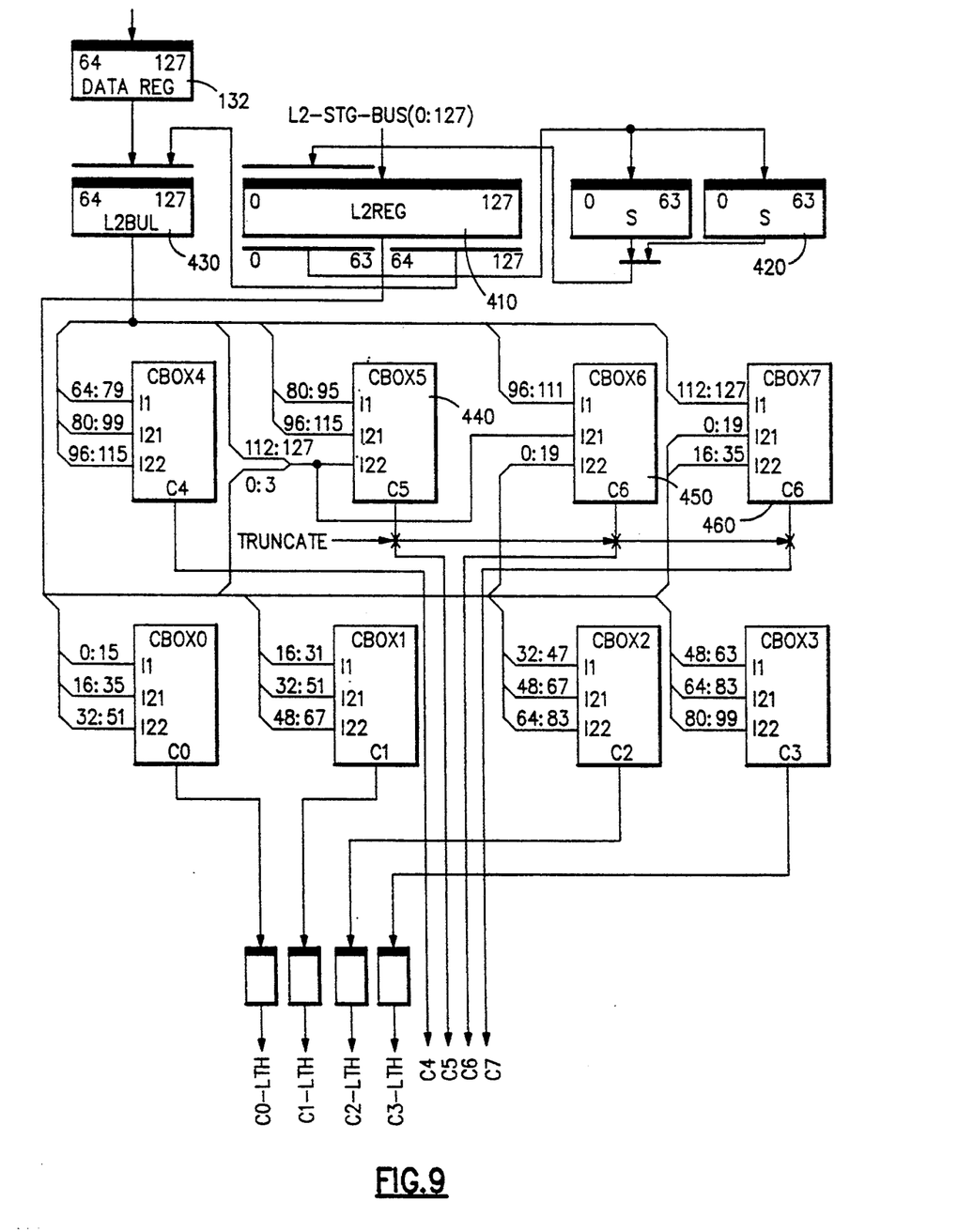
FIG. 9 shows a representative Instruction Compounding Unit with additional register and multiplexer means necessary to support cross-line compounding operations.

Referring now to FIG. 9, the instructions from the first cache line necessary to create the compounding bits of this invention reside in DATA REG 132 after having been fetched from CACHE ARRAY 114 as previously described. As quadwords of instruction text are being inpaged to CACHE ARRAY 114, they pass through ICU 12, and in particular through L2REG 410. The line may be arbitrarily rotated, i.e., QW0 may not be the first quadword to be received from MEMORY 10. Whenever QW0 arrives at the ICU and is latched in L2REG 410, it is latched in S0 420 on the following cycle and retained until after the compounding tag bits for the second line have been calculated. On a subsequent cycle, the contents of S0 420 are gated back into the high half of L2REG 410. Simultaneously, the contents of DATA REG 132 are gated into L2BUL 430. A final compounding operation is then performed in CBOX5 440, CBOX6 450, and CBOX7 460, providing the lattermost compounding bits for the first cache line. Said compounding bits are subsequently stored in TAG ARRAY 116 using the address from A REG 140.

Figure 10:
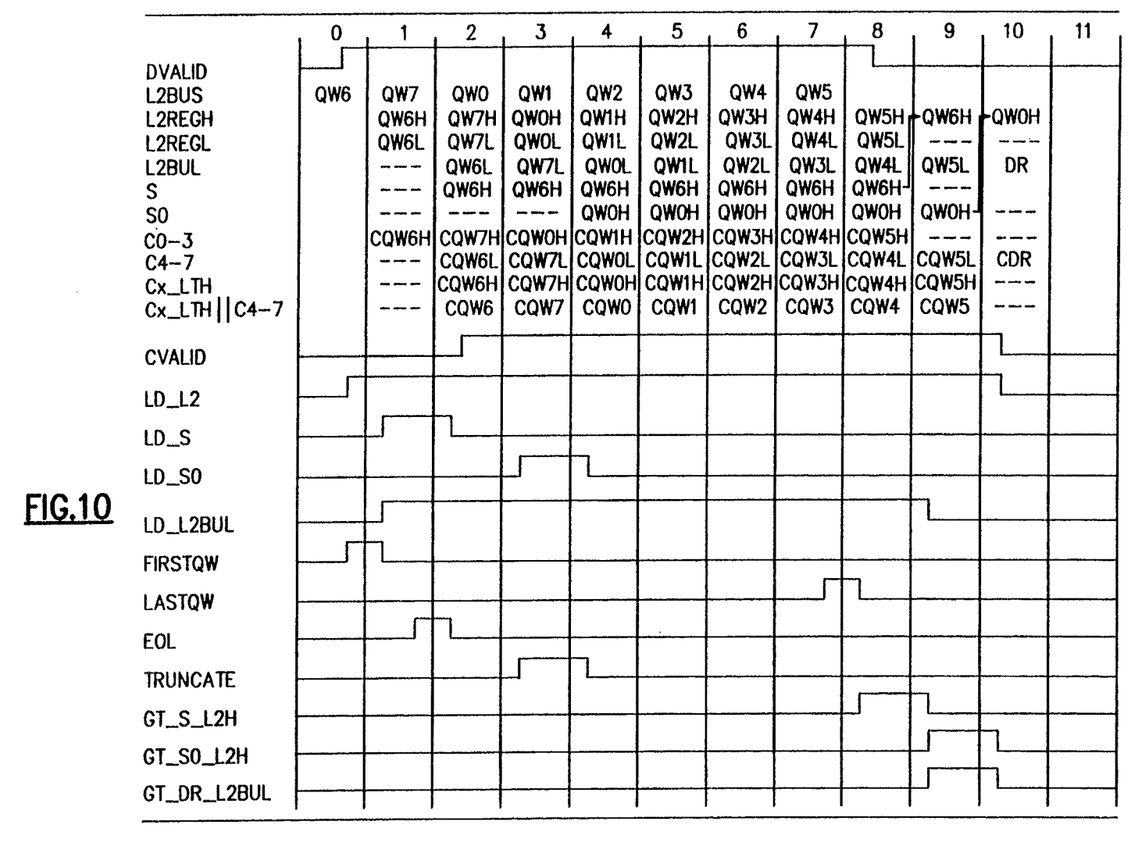
FIG. 10 shows a sequence chart for a cache inpage operation starting with the next-to-last quadword in a cache line and additional steps necessary to perform cross-line compounding.

FIG. 10 shows a representative timing sequence for a cross-line compounding operation starting with QW6. This operation may be compared to the sequence shown in FIG. 3 which shows a compounding operation also starting with QW6, but without cross-line compounding.

Referring to FIG. 10, the ICU operation is as follows. Assume that an instruction cache miss has occurred and that QW6 is the required QW. In cycle 0, QW6 is on L2_STG_BUS, and DVALID is asserted. This causes FIRSTQW to be asserted, which, in turn, causes LD_L2 to be asserted and also triggers the one-cycle assertion of LD_S in cycle 1. LD_L2 remains asserted until the cycle after GT_S_L2H has been asserted (cycle 8). In cycle 1, QW7 is on L2_STG_BUS. Since this is the last (right-most) QW of the line, EOL is asserted. The assertion of EOL will trigger the assertion of TRUNCATE and LD_S0 in cycle 3. Since LD_S is asserted, QW6H will be latched in S at the end of cycle 1, where it will be held until cycle 9. LD_L2BUL is also asserted. Thus, the low DW of L2REG will be latched in L2BUL at the end of the cycle. Also, C bits for QW6H (,CQW6H) are produced by CBOXes 0–3 and are latched in their respective latches.

In cycle 2, QW7 is latched in L2REG. Now valid C bits can be produced for QW6L, which is now in L2BUL. These C bits are present on the outputs of CBOXes 4–7. Thus, C0–3_LTH || C4–7 constitute the C bits for QW6, the low DW of which is now in L2BUL.

In cycle 3, valid C bits are available for QW7, now in L2BUL, but C5, C6, and C7 must be truncated. Thus, TRUNCATE is asserted in this cycle, which forces these bits to zero. The assertion of LD_S0 causes QW0H to be saved in S0 until it is needed for cross-line compounding.

Production of C bits continues routinely until cycle 7 when LASTQW is asserted. In cycle 8, GT_S_L2H is asserted, causing QW6H (the high DW of the first QW received) to be gated into L2REGH at the end of the cycle. Simultaneously, QW5L is gated into L2BUL, as usual. Then, in cycle 9, valid C bits are produced for QW5.

The assertion of GT_S_L2H in cycle 8 also triggers the assertion of GT_S0_L2H and GT_DR_L2BUL in cycle 9. The high order portion of QW0 is loaded back into the high order part of L2REG, and the latter portion of the previous cache line saved earlier in DATA REG 132 is loaded into L2BUL, as indicated by DR in cycle 10 in FIG. 10. In cycle 10, the compounding bits C5, C6, and C7 for the previous cache line (CDR in FIG. 10) are created and passed to the TAG ARRAY 116. Only C5, C6, and C7 are valid during cycle 10. The remaining tag bits in TAG ARRAY 116 are not altered by the cross-line compounding operation.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A data processing system in which instructions are transferred in blocks called instruction lines from a relatively low speed memory to a relatively high speed cache memory and from which cache memory instruction lines are fetched for execution and are deleted a line at a time, said system including an instruction compounding unit in which instructions are processed in order to generate tag information that indicates instructions that can be executed in parallel, said data processing system comprising in combination:

means to address a first instruction line in said cache memory in order to transfer said first instruction line from said cache memory to an instruction fetch unit;
   means to generate a miss signal if said first instruction line is not resident in said high speed cache memory;
   means responsive to said miss signal for transferring said first instruction line from said relatively low speed memory to said instruction compounding unit;
   means responsive to said miss signal for determining an address of a second instruction line that is next in succession to said first instruction line for transfer to said instruction fetch unit;
   means for transferring said second instruction line to said instruction compounding unit if said second instruction line resides in said cache memory;
   said instruction compounding unit processing instructions from said first instruction line and said second instruction line in order to generate tag information indicating an instruction in said first instruction line that can be executed in parallel with an instruction in said second instruction line
   means for determining if an instruction line in said cache memory has been deleted and replaced prior to its execution;
   means to determine if said deleted and replaced instruction line contains instructions that have been compounded with another instruction line in said cache memory; and
   means to delete tag information that indicates an instruction in said another instruction line can be compounded with an instruction in said instruction line that has been deleted and replaced.

2. A data processing system as in claim 1 wherein said second instruction line is transferred to said instruction compounding unit during an interval when said first instruction line is transferred from said relatively low speed memory to said instruction compounding unit.

3. A processing system as in claim 1, wherein said means for determining an address includes means to decrement the address of a missed instruction.

4. A processing system as in claim 1, wherein said means for determining an address includes means to decrement the address of a missed instruction.

5. A processing system as in claim 1, wherein said means for determining an address includes means to decrement the address of a missed instruction.

* * * * *